United States Patent [19]
Barber

[11] Patent Number: 6,049,063
[45] Date of Patent: Apr. 11, 2000

[54] LOW VOLTAGE WIRE MESH HEATING ELEMENT

[76] Inventor: Nicholas Everard Ashby Barber, P.O. Box 1070, Nelson, New Zealand, 7001

[21] Appl. No.: 09/051,995
[22] PCT Filed: Oct. 24, 1995
[86] PCT No.: PCT/NZ95/00108
 § 371 Date: Oct. 18, 1999
 § 102(e) Date: Oct. 18, 1999
[87] PCT Pub. No.: WO97/16052
 PCT Pub. Date: May 1, 1997
[51] Int. Cl.[7] .............................. H05B 3/34; H05B 3/36; F24D 13/02
[52] U.S. Cl. .......................... 219/213; 219/549; 338/208
[58] Field of Search ................... 219/213, 528, 219/529, 545, 549, 548; 112/405; 338/208, 210; 392/432–436

[56] References Cited

U.S. PATENT DOCUMENTS

| | | | |
|---|---|---|---|
| 1,710,795 | 4/1929 | Arms | 338/308 |
| 2,063,663 | 12/1936 | Downard | 338/208 |
| 2,065,760 | 12/1936 | Smith | 338/308 |
| 2,165,970 | 7/1939 | Jaspers | 392/435 |
| 2,533,409 | 12/1950 | Tice | 338/208 |
| 2,631,219 | 3/1953 | Suchy | 219/549 |
| 2,868,378 | 1/1959 | Burstlein | 338/208 |
| 3,047,701 | 7/1962 | Frungel | 219/213 |
| 3,513,297 | 5/1970 | Jordan | 338/308 |
| 4,052,588 | 10/1977 | Nakamura et al. | 219/345 |
| 4,107,363 | 8/1978 | Dawn et al. | 428/109 |
| 4,423,694 | 1/1984 | Senneville | 112/405 |
| 4,439,666 | 3/1984 | Graham | 219/213 |
| 4,581,522 | 4/1986 | Graham | . |
| 4,713,531 | 12/1987 | Fennekels et al. | 219/545 |
| 5,804,799 | 9/1998 | Stewart | 219/528 |

FOREIGN PATENT DOCUMENTS

| | | |
|---|---|---|
| 215989 | 9/1957 | Australia . |
| 0049608 | 1/1986 | European Pat. Off. . |
| 1105748 | 12/1955 | France . |
| 2639347 | 3/1978 | Germany . |
| 117814 | 12/1958 | New Zealand . |
| 419843 | 11/1934 | United Kingdom . |
| 945795 | 1/1964 | United Kingdom . |
| 1139576 | 1/1969 | United Kingdom . |
| 1189161 | 4/1970 | United Kingdom . |
| 1478919 | 7/1977 | United Kingdom . |
| 1498941 | 1/1978 | United Kingdom . |

*Primary Examiner*—John A. Jeffery
*Attorney, Agent, or Firm*—Brown Martin Haller & McClain, LLP

[57] ABSTRACT

A method of heating a surface in which a wire mesh or netting heating element is spread evenly over or just under an area to be heated, and through which an electrical current is driven. The two ends of the heating element are connected to the secondary terminals of a transformer, which converts the supply voltage to a low and safe level.

13 Claims, 4 Drawing Sheets

LOW VOLTAGE WIRE MESH HEATING ELEMENT

TECHNICAL FIELD

This invention relates to the heating of large surfaces.

BACKGROUND ART

European Patent 0048608 describes a heating concept wherein low voltage electricity is passed through bare uninsulated electrical conductors into a medium which contains a large volume of non-gaseous material for storing the heat for gradual dissipation. The apparatus described in European Application No. 0048608 by Charlton Thermosystems is primarily designed to store and dissipate heat.

The Charlton Thermosystems concept is to heat a medium with an embedded looped heating element. The heating elements are in the form of steel bars, wire rope, and, it is said, can be embedded in a medium or a base material for the medium. Heat is not dissipated uniformly over a given area.

An object of the present invention is to use low voltage electricity to instantaneously heat large surface areas using similar transformation technology to that described in European Patent No. 0049608.

Further objects and advantages of the present invention will become apparent from the ensuing description.

According to the present invention there is provided a method of heating a surface by means of wire mesh or netting heating element spread evenly over or just under the area to be heated through which an electrical current is driven comprising connecting the two ends of the element to the secondary terminals of a transformer which converts the supply voltage to less than 40 volts.

The mesh heating element is elongated and between 10 m and 100 m long, and has a width of between 75 mm and 1200 mm.

Preferably the wire mesh or netting thickness is less than 2 mm.

The heating element can be uninsulated and encased in a settable medium.

The heating element can provide 2500 $cm^2$ to 6000 $cm^2$ of surface per 100 watt output for every square meter to be heated.

According to a further aspect of the present invention there is provided a method of heating a surface by means of wire mesh or netting heating element spread evenly over or just under the area to be heated through which an electrical current is driven comprising connecting the two ends of the element to the secondary terminals of a transformer which converts a supply voltage of the order of standard mains voltage volts to less than 40 volts at 16 amps to 240 amps current throughput depending on size.

The mesh heating element may be elongated and may be between 10 m and 100 m long, and have a width of between 75 mm and 1200 mm, depending on the size and dimensions of the area to be heated. Wire thickness may be less than 2 mm diameter which requires only a very thin layer of grout, bedding compound, adhesive or plaster where particular floor surfaces require such a backing.

The voltage across the heating element is preferably less than 40 volts and in most cases will be around 30 volts so the dimension of the copper cable is compatible with the wire in the mesh.

Steel is used as both conductor and heating element and is commonly uninsulated but may be encased in grout, bedding compound, adhesive, plaster or PVC sheet etc to hold the elements in position.

Cross wires may be used to:
1. Conduct heat from hot spots.
2. Conduct electricity around the hot spots.
3. Hold the wires in a uniform layout.
4. Double the heat dissipating surface area of the conductor.

The method can provide a heating element with some 2500 $cm^2$ to 6000 $cm^2$ of surface per 100 watt output for every square meter to be heated.

The heated surface may be a floor, wall and ceiling of a building, yard or vessel.

The special value of the mesh heating is the very even spread of heat over large surface areas, the great strength of the heating element itself which provides security of the system against rough handling during installation, surface medium cracking or movement during use, and the low voltage electricity used, providing electrical safety against contact with the heating element and/or soaking in water.

The invention is specifically aimed for use in providing 24 hour per day switch on/switch off heat to carpet, vinyl, linoleum, tiled and grout or levelling type compound surfacing. The system could be used for many other surface heating requirements and may be used for supplying heat to a surface for only short periods of time if that is what is required.

The mesh proposed to be used is galvanised welded wire mesh constructed of 18 Birmingham wire gauge wire on a square grid 25.4 mm, 19 mm or 12.7 mm centres and the mesh is presently supplied in rolls 915 mm wide by 30.5 m long. However mesh of other dimensions could be used provided the transformer was designed to match the heating element dimensions. (Diamond woven mesh—'chicken netting' can also be used and may even perform better in some situations).

A typical heating element made from this mesh will have a surface area of up to 5760 $cm^2$ per sq meter in contact with solid medium in which it is embedded. Steel rope or wire method is unsuitable for use right at the surface because the floor would have warm lines at say 30 to 50 cm centres with cold patches between and could damage the surface by means of the uneven heating and cooling. On the other hand the present invention spreads the heat evenly and has the transverse wires to conduct heat laterally and reduce hot spots that might be caused by some material of poor conductivity laying on the heated surface.

By using cross wires in the circuit the heat dissipation is speeded up and the wires will not normally reach more than 40 degrees C. Local overheating along the circuit due to a faulty wire or join would normally produce an increase in resistance and more heat coming into the spot which is already hot. In the system of this invention, the cross wires will conduct electricity around the higher resistance hot patch, putting less power into the spot as well as conducting heat from the area via the wires. This is an important safety feature since the heating system is expected to be used in living rooms and bedrooms where blankets, clothes, rugs etc could overlay the heating surface and is not offered by the technology described in European Application No. 0048608.

Although in most circumstances it is advantageous to have the mesh bare and uninsulated, there are some situations where there could be a requirement to have it insulated such as when the surface to be heated is to be a good conductor of electricity. In these cases the mesh could be plastic coated. In a corrosive environment where the galvanising is vulnerable, it may also be advantageous to have a plastic coating.

Because of the high electrical currents involved in the heating circuit, low resistance at the joining of the conductors is critical to the safety of the equipment. Joints in the heating element for small areas have been minimised by a method of cutting sheets of mesh into a circuit.

Each end of the heating element is normally welded to a copper, aluminium or steel strip or cable of some 15 to 30% the resistivity of the heating element. These are called "cold leads" and each one is in turn bolted or crimped to the transformer terminals in a similar way to how a motor vehicle's electrical starting circuit is connected to the battery. The cold leads are normally insulated.

The transformer that is proposed to be used is any double wound isolating transformer capable of converting the input voltage to under 30 V and safely handling the continuous power consumed.

The transformer primary circuit may be fitted with a thermocouple temperature cut-out and an overload cut-out in case of short circuit. They will also normally have switches connected to various tappings so that one of several heat outputs can be selected. In some situations the input power may be controlled by a thermostat. It will be usual to have an indicator light to show when the heater is on. A rectifier may be used in situations where a direct current is an advantage.

This invention is directed specifically towards heating under carpets in existing buildings and the following features are specific to that end.

The invention/design is such that existing carpet can be lifted and the heating element placed and fixed where required and the carpet re-laid.

The idea of low voltage heating through steel elements has been around for many years but this invention provides the means of spreading the heat more uniformly and more efficiently than any other system.

To our knowledge no other low voltage system has been able to be used directly under the carpet.

1. The invention uses welded steel mesh to provide a flat heating surface of large area. The thinness of the element, less than 2 mm, and close spaced wire grid 25.4 mm×25.4 mm or 19 mm×19 mm or 12.7 mm×12.7 mm ensures that foot traffic will not detect the heating element and also that no filler or hard covering is required.
2. The invention provides a method of using standard width, wide sheets to achieve the length of circuit with minimum joints.
3. A method for holding elements in position during transport and installation and preventing short circuit is provided where polypropylene or polythene sheet under the element is glued or fused to strip, sheet or patch over the mesh each side of the space between elements and where a cut is made the wires are bent in such a manner that when taped the rows of wire stubs resist any tendency of the rows to move towards each other.
4. Where joints are required the invention provides strong methods of joining with minimal brazing and which avoids fire risk without significantly increasing the thickness of the element.
5. The invention further provides a method of joining the copper cold leads to the mesh without risk of fire or significantly increasing the thickness of the elements by using stranded copper cable with strands of similar dimension to the steel wire in the mesh or flat copper sheet for larger units where the current is very high and which are welded to the mesh in a manner which maintains the integrity of the circuit and the thinness of the heating element.
6. A circuit layout with a plurality of legs is provided, where only one leg of the circuit has to be insulated from the rest to prevent serious short circuit. (Short circuits between two adjacent legs would not have serious consequences).

BRIEF DESCRIPTION OF DRAWINGS

Aspects of the present invention will now be further described with reference to the accompanying drawings in which.

DETAILED DESCRIPTION OF THE PREFERRED EMBODIMENTS

Figure 1:
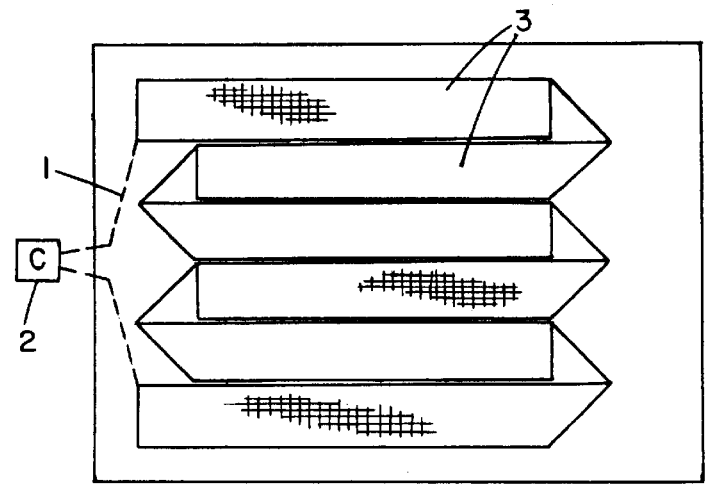
FIGS. 1 and 2: illustrates possible heating element layouts.
Figure 2:
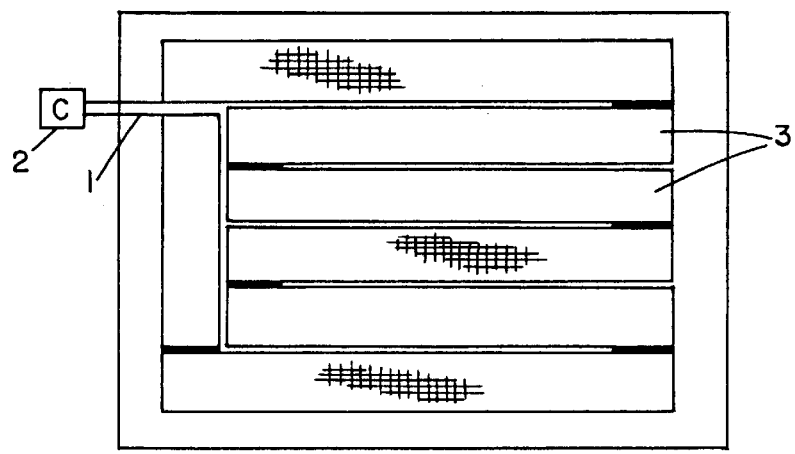
Figure 4:
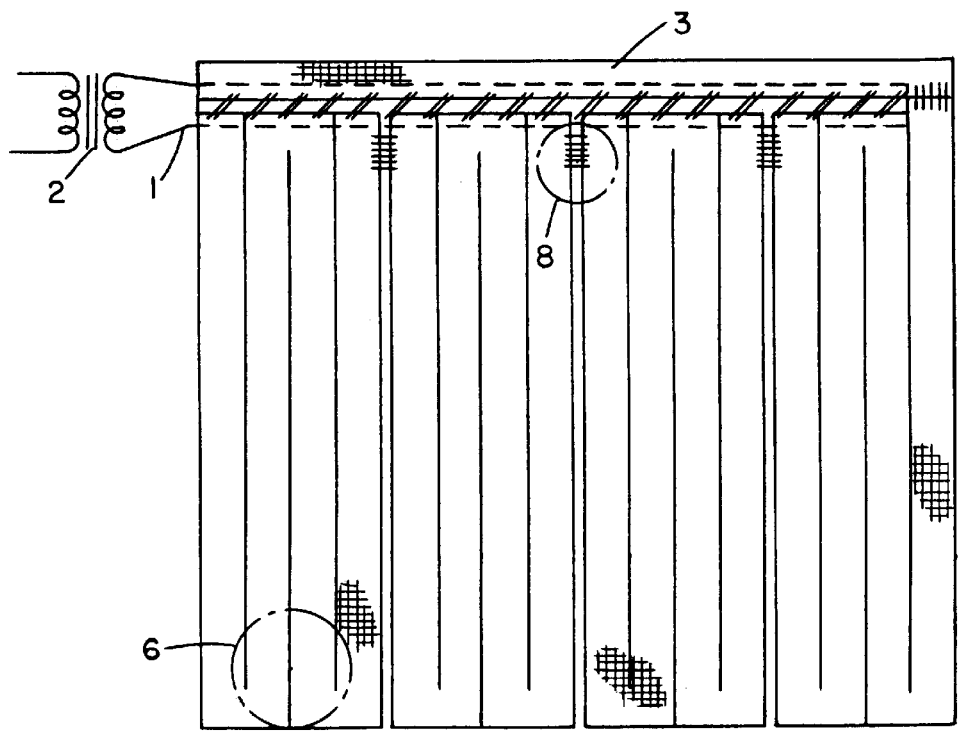
FIGS. 4 and 5: shows the use of a plurality of heating elements to heat a particular area.
Figure 6:
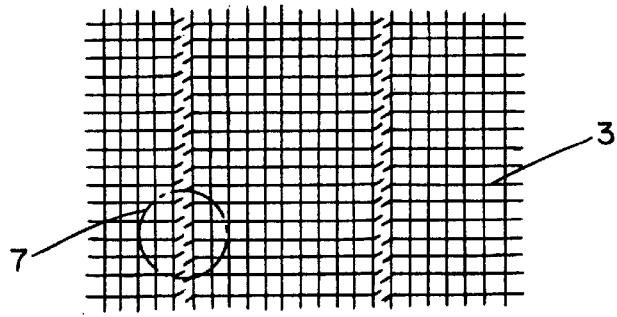
FIG. 6 is an enlarged view of the circled area of the wire mesh labeled 6 in FIG. 4, showing adjacent heating elements.
Figure 8:
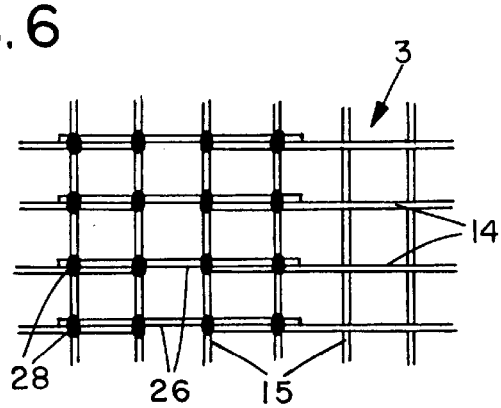
FIG. 8 is an enlarged view of the circled area labeled 8 in FIG. 4, showing brazing of two adjacent sections of mesh

In FIGS. 1, 2 and 4, cold leads 1 (as described herein) on the output side of transformer 2 are connected to spaced apart elements 3 all of which are electrically connected and form a continuous circuit. As is implied the mesh elements 3 may be in many different sizes and shapes. As best illustrated in FIGS. 6 and 8, the mesh heating element 3 comprises a plurality of longitudinal wires 14 connected together through welding to a plurality of cross wires 15.

Figure 3:
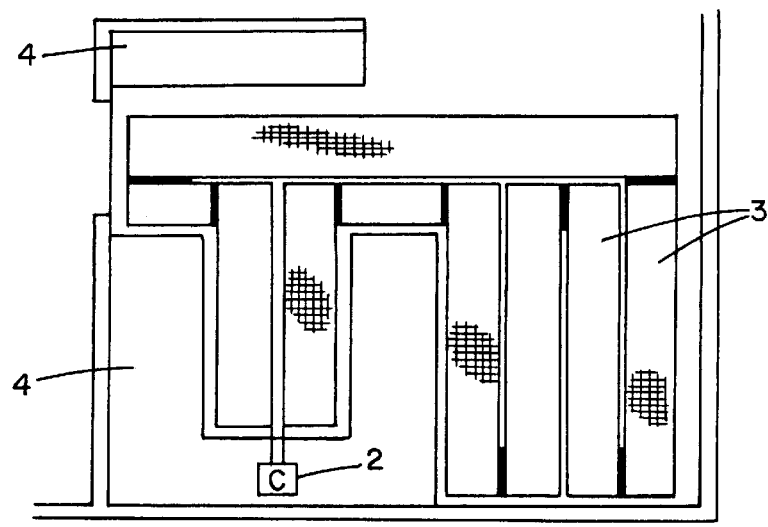
FIG. 3: illustrates a further possible heating element layout.

In FIG. 3 the elements 3 are laid out to heat exposed floor area in a kitchen, laboratory or such like which includes furniture items such as cupboards, or benches 4.

FIG. 4 illustrates how a 1 kVA transformer can be used to heat a 3.2 m×3.4 m area using welded wire mesh cut and welded to form a 200 mm wide heating element over 50 m long. In this case the output voltage is 30V and the element is constructed from 18 B W G mesh on a one inch grid. The same element layout could be used for a 2 ka transformer with 30V output to heat an element constructed of 18 B W G mesh on a half inch grid. In this case the heat output would be twice as much per square meter.

Figure 5:
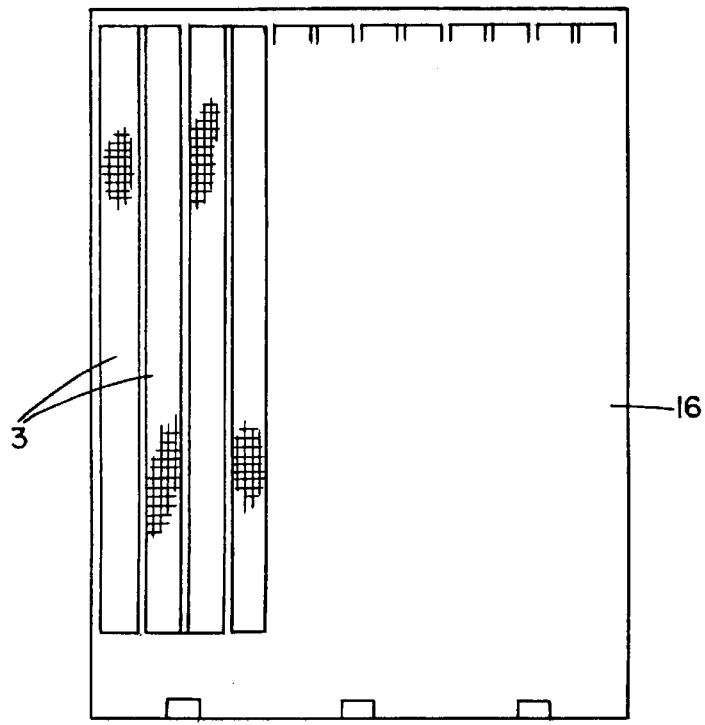

FIG. 5 illustrates a method for heating a very large area such as a hall or shop floor 16 with mesh heating elements 3.

FIG. 6 shows part of the circuit of FIG. 4 in more detail. As illustrated in FIG. 6, cuts are made in the mesh to provide an elongated circuit of mesh.

Figure 7:
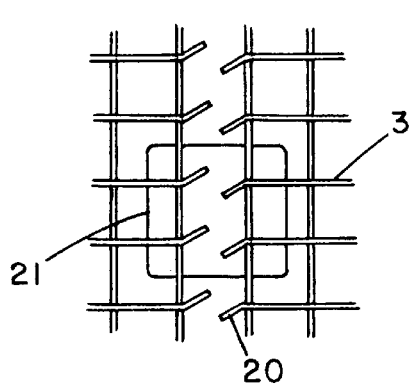
FIG. 7 is a further enlarged view of the circled area of FIG. 6, illustrating the cut areas in more detail.

FIG. 7 shows how the cut is formed and taped in a way that inhibits movement that would tend to make a short circuit. The cut wires are bent to form bent ends 20, as illustrated in FIG. 7, such that the cut ends will not touch even if the adjacent legs of the mesh close up slightly. A patch 21 of tape is adhered over the cut ends to further inhibit movement which could otherwise result in a short circuit.

FIG. 8 shows how a standard joint is brazed. Cross wires or wire links 26 are used to hold the conducting wires in a uniform layout. Weld points 28 join the wire links to the mesh 3 at each end.

Figure 9:
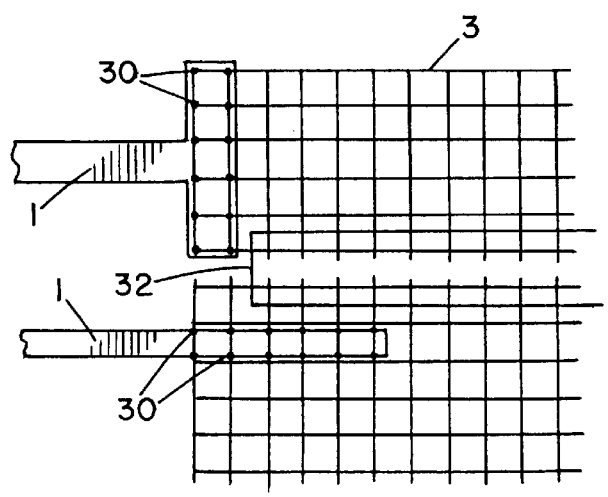
FIG. 9: shows how copper leads can be joined to heating elements.

FIG. 9 shows how the copper leads of the FIG. 4 embodiment may be joined to the mesh and how the one leg of the circuit may be insulated to prevent a short circuit to other legs. As illustrated in FIG. 9, copper leads 1 are applied to the tops of two adjacent sections of mesh and welded at weld points 30. Insulation 32 is included to provide electrical isolation between the two banks or legs of mesh 3.

Figure 10A:
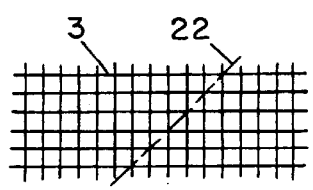
FIG. 10A illustrates formation of a diagonal cut in a heating element.
Figure 10B:
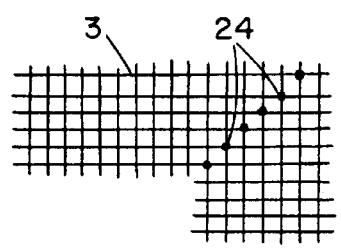
FIG. 10B illustrates welding of a joint between the cut sections of FIG. 10A.

FIGS. 10A and 10B show a method of turning a length of element 90 degrees without increasing the thickness of the element itself. The element is cut at 45 degrees along line 22 as indicated in FIG. 10A, halfway between the mesh welds. One section is turned over and the join meshed together so that one solder point 24 will join four wires as illustrated in FIG. 10B.

Figure 11:
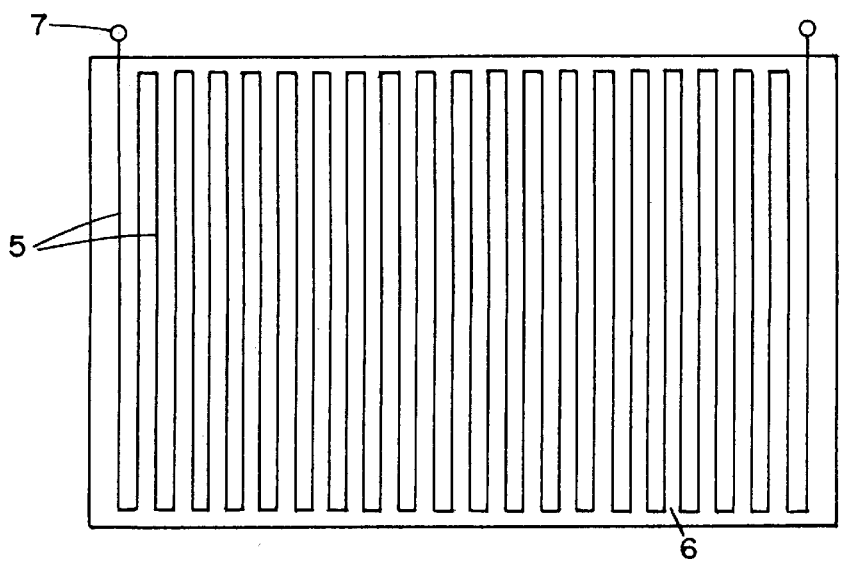
FIG. 11: is a plan view of a heating element for heating a small area.

A variation on the method of heating is adopted for heating a very small area, 0.125 m$^2$ by means of using a standard car battery charger. As is known in the field, a standard car battery charger can be more precisely defined as a transformer capable of converting mains voltage to between 6 and 24 volts and which has less than 150 VA capacity. The battery charger output terminals are connected to a 10 m length of small diameter steel wire 5 of less than 0.7 mm$^2$ which is woven into a pattern with the wire legs 12.5 mm apart as shown in FIG. 11, and then sandwiched between two sheets 6 of polythene. Looped ends 7 of the wire 5 are used as terminal connections. This system will operate at approximately 4.5 volts and 3 amps. The two sheets of polythene are glued or fused together to hold the wires in position. This 15 watt unit is designed for bottom heating for home propagation of seedlings or pot plants, pet box warmers or foot warmers for those who own a battery charger. This variation is unique in that it is specific to a home battery charger and incorporates the close spaced small diameter wiring to provide even heat, low voltage, steel wire and polythene cladding of the invention. The layout of wire shown in FIG. 11 and polythene cladding allows the heating pad to be rolled up into a parcel (tube) that incurs low cost postage fees.

Figure 12:
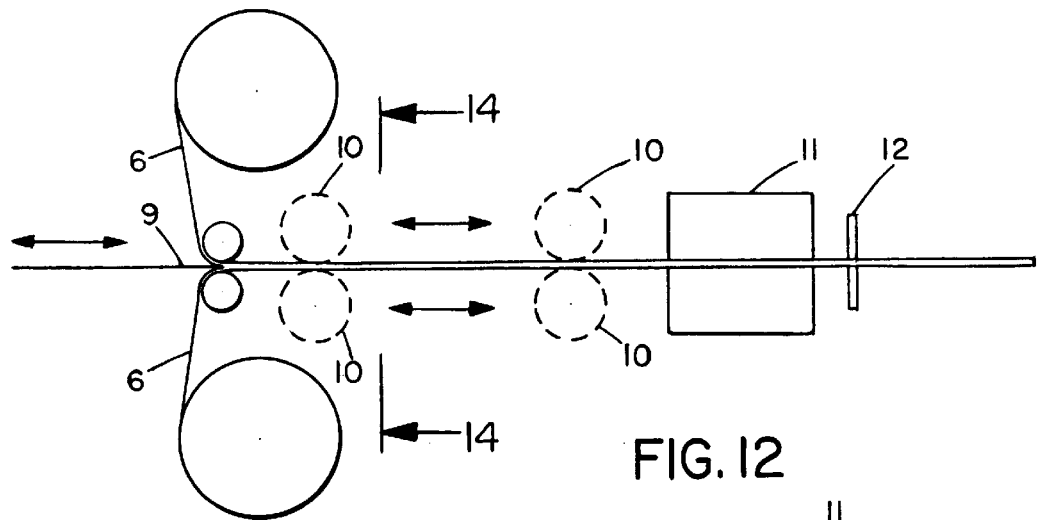
FIGS. 12 and 13: are side and plan views showing apparatus and methodology for manufacture of the elements of FIG. 11, and FIG. 14: is an end view of parts of the apparatus of FIGS. 12 and 13.
Figure 13:
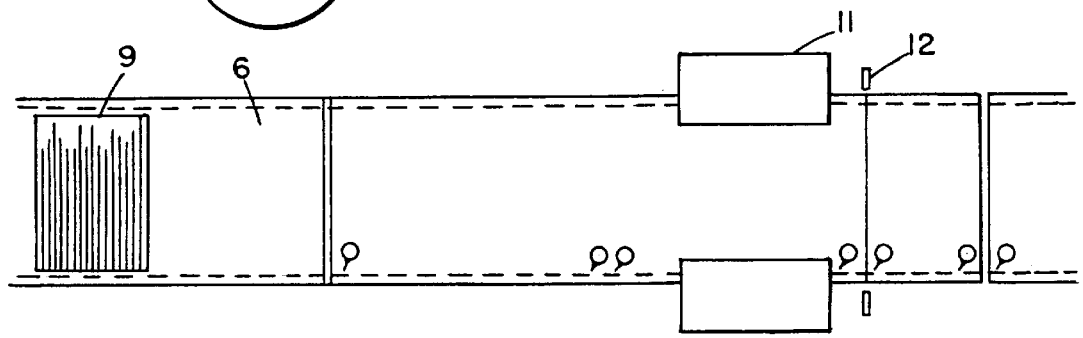
Figure 14:
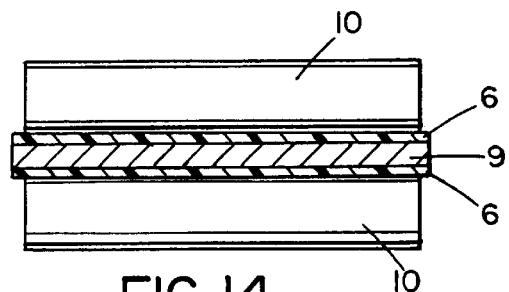

In FIGS. 12, 13 and 14, a mechanical method of construction for the element of FIG. 11 is proposed which takes two rolls of polythene 6 pre-stamped with instructions and advertising and feeds them each side of the loom frame 9 on which the heating element is threaded. Seal bar rollers 10 then run over the frame, sealing the straight lengths of wire between the polythene sheets 6. Edging machines 11 then clad the wire loops each side and the heating panels are then cut and packaged ready for dispatch. The process is illustrated diagrammatically in FIGS. 12 and 13. The loom frame shown in FIG. 13 moves forward between the seal bar operation area then after sealing releases the wire and withdraws to be re-threaded. An alternative to using seal bar rollers is to use a pair of plates which seal each panel in a single action. The advanced web can be cut using a cutting device 12.

It can be noted from FIG. 14 that the polythene sheets protrude beyond the seal bars. After the main sealing is done the loom frame releases the wires and the product moves forward to have the edges sealed.

Aspects of the present invention have been described by way of example only and it should be appreciated that modifications and additions may be made thereto without departing from the scope thereof as defined in the appended claims.

I claim:

1. A method of heating a floor, wall or ceiling by means of an elongate wire mesh or netting heating element including a plurality of physically and electrically connected longitudinal and crosswise wires, said longitudinal and crosswise wires being welded together to form a mesh heating element of at least 10 meters length and at least 75 millimeters width and with a thickness of less than 2 millimeters, said method of heating comprising the steps of:

(a) fabricating a mat of welded mesh heating element comprising a plurality of longitudinal wires connected together through welding to a plurality of cross wires, (b) spreading said element evenly across an area to be heated through which an electrical current is driven, and (c) connecting the two ends of the element to a power source with a voltage of less than 40 volts.

2. A method as claimed in claim 1, wherein the heating element is uninsulated and encased in a settable medium.

3. A method of heating as claimed in claim 2, wherein the settable medium is grout.

4. A method of heating as claimed in claim 2, wherein the settable medium is a bedding compound.

5. A method of heating as claimed in claim 2, wherein the settable medium is an adhesive.

6. The method as claimed in claim 1, wherein the heating element is spread over a surface area to be heated, the surface comprising a wall, floor or ceiling.

7. The method as claimed in claim 1, including the steps of laying the heating element over a floor, and laying a floor covering sheet over the heating element.

8. A method as claimed in claim 1, wherein the heating element provides 2500 cm$^2$ to 6000 cm$^2$ of surface per 100 watt output for every square meter to be heated.

9. A method of heating as claimed in claim 1, wherein the power supply is capable of converting mains supply voltage to less than 40 volts.

10. A method as claimed in claim 1, wherein connectors are used to connect the element to the power source, and the connectors are less than 2 millimeters thick.

11. A method as claimed in claim 1, wherein the crosswires increase the heat dissipating surface area of the heating element.

12. A heating element, comprising two sheets of material; a wire netting or mesh heating element sandwiched between said two sheets of material; the wire netting or mesh having terminal ends adapted for connection to a power source having a voltage less than 40 volts; and said wire netting or mesh including a plurality of physically and electrically connected longitudinal and crosswise wires, said wires being welded together to form a mesh heating element of at least 10 meters length and at least 75 millimeters width and with a thickness of less than 2 millimeters.

13. A method of heating a surface, comprising the steps of sandwiching a small diameter mild steel wire heating element formed from a mesh of longitudinal and crosswise wires welded together between two sheets of material, the heating element having a length of at least 10 meters and a width of at least 75 millimeters and a thickness of less than 2 millimeters, said heating element being positioned evenly between two sheets under the area to be heated, and driving an electrical current through the heating element by connecting the two ends of the element to the terminals of a transformer converting means capable of converting mains voltage to between 6 to 24 volts, and which has less than 150 VA capacity wherein the diameter of said wire being approximately 0.7 millimeters.

* * * * *